United States Patent
Cormier

(10) Patent No.: US 11,112,390 B2
(45) Date of Patent: Sep. 7, 2021

(54) ON-LINE SAMPLING FROM A PROCESS SOURCE

(75) Inventor: Sylvain Cormier, Mendon, MA (US)

(73) Assignee: WATERS TECHNOLOGIES CORPORATION, Milford, MA (US)

( * ) Notice: Subject to any disclaimer, the term of this patent is extended or adjusted under 35 U.S.C. 154(b) by 0 days.

(21) Appl. No.: 13/519,798

(22) PCT Filed: Feb. 10, 2011

(86) PCT No.: PCT/US2011/204292
§ 371 (c)(1),
(2), (4) Date: Jun. 28, 2012

(87) PCT Pub. No.: WO2011/106162
PCT Pub. Date: Sep. 1, 2011

(65) Prior Publication Data
US 2012/0305464 A1   Dec. 6, 2012

Related U.S. Application Data

(60) Provisional application No. 61/307,024, filed on Feb. 23, 2010.

(51) Int. Cl.
*G01N 30/20* (2006.01)
*G01N 35/10* (2006.01)
(Continued)

(52) U.S. Cl.
CPC ......... *G01N 30/20* (2013.01); *G01N 35/1097* (2013.01); *G01N 1/38* (2013.01);
(Continued)

(58) Field of Classification Search
None
See application file for complete search history.

(56) References Cited

U.S. PATENT DOCUMENTS 4,094,196 A * 6/1978 Friswell ................. G01N 30/24
73/864.21
4,153,076 A   5/1979 McNeil et al.
(Continued)

FOREIGN PATENT DOCUMENTS

EP   0723517 A1   4/1991
JP   63071650 A    4/1988
(Continued)

OTHER PUBLICATIONS

"Concurrent". Dictionary.com. Accessed on Mar. 2, 2015 from <http://dictionary.reference.com>. Collins English Dictionary.*
(Continued)

*Primary Examiner* — Katherine Zalasky McDonald
(74) *Attorney, Agent, or Firm* — Schmeiser, Olsen & Watts LLP

(57) ABSTRACT

An online sample manager of a liquid chromatography system includes a fluidic tee having a first inlet port, a second inlet port, and an outlet port. A diluent pump moves diluent from a diluent source to the first inlet port of the fluidic tee. A valve has a fluidic intake port connected to a process source for acquiring a process sample therefrom. A pumping system moves the acquired process sample from the valve into the second inlet port of the fluidic tee where the process sample merges with the diluent arriving at the first inlet port to produce a diluted process sample that flows out from the outlet port of the fluidic tee.

12 Claims, 12 Drawing Sheets

(51) Int. Cl.
*G01N 30/18* (2006.01)
*G01N 1/38* (2006.01)

(52) U.S. Cl.
CPC ....... *G01N 30/18* (2013.01); *G01N 2030/201* (2013.01); *G01N 2030/202* (2013.01); *Y10T 137/0318* (2015.04); *Y10T 137/85978* (2015.04)

(56) References Cited

U.S. PATENT DOCUMENTS

| | | | |
|---|---|---|---|
| 5,297,431 | A | 3/1994 | White |
| 6,684,720 | B2 | 2/2004 | Sgourakes |
| 6,712,587 | B2 | 3/2004 | Gerhardt et al. |
| 6,790,361 | B2 * | 9/2004 | Wheat ................ B01D 15/166 210/143 |
| 7,189,964 | B2 | 3/2007 | Castro-Perez et al. |
| 7,563,410 | B2 | 7/2009 | Abele et al. |
| 2002/0011437 | A1 | 1/2002 | Kaito et al. |
| 2002/0146349 | A1 * | 10/2002 | Gygi et al. ................... 422/70 |
| 2006/0045810 | A1 | 3/2006 | Choikhet et al. |
| 2006/0054543 | A1 * | 3/2006 | Petro ................... G01N 30/20 210/198.2 |
| 2007/0287192 | A1 | 12/2007 | Usowicz et al. |
| 2008/0210614 | A1 | 9/2008 | Gilar et al. |
| 2009/0032966 | A1 | 3/2009 | Pensak, Jr. et al. |

FOREIGN PATENT DOCUMENTS

| | | |
|---|---|---|
| JP | 6167481 A | 6/1994 |
| JP | 2001343373 A | 12/2001 |
| WO | 0250531 A2 | 6/2002 |
| WO | 2006083776 A2 | 8/2006 |
| WO | 2006106177 A1 | 10/2006 |
| WO | 2009088663 A1 | 7/2009 |
| WO | 2009111229 A2 | 9/2009 |

OTHER PUBLICATIONS

International Search Report for counterpart international patent application No. PCT/US2011/024292 dated Apr. 14, 2012; 3 pages.
First Office Action in related Japanese Patent Application No. 2012-555023, dated Feb. 25, 2014; 6 pages.
Extended European Search Report in counterpart European patent application No. 11747856.0, dated Dec. 16, 2014; 7 pages.
Second Office Action in related Japanese Patent Application No. 2012-555023, dated Mar. 3, 2015 4 pages.
Examination Report in European Patent Application No. 11747856.0 dated Jul. 19, 2019; 6 pages.
Examination Report in European Patent Application No. 11747856.0 dated Feb. 25, 2020; 5 pages.

* cited by examiner

ON-LINE SAMPLING FROM A PROCESS SOURCE

RELATED APPLICATION

This application claims priority to and the benefit of U.S. provisional application No. 61/307,024, filed on Feb. 23, 2010, titled "On-line Sampling from a Process Source," the entirety of which application is incorporated by reference herein.

FIELD OF THE INVENTION

The invention relates generally to liquid chromatography systems. More specifically, the invention relates to systems and methods for sampling directly from a process source.

BACKGROUND

Chromatography is a set of techniques for separating a mixture into its constituents. For instance, in a liquid chromatography application, a pump takes in and delivers a mixture of liquid solvents to a sample manager, where a sample awaits its arrival. A sample, in general, is the material being analyzed. Examples of samples include complex mixtures of proteins, protein precursors, protein fragments, reaction products, and other compounds, to list but a few.

Various industries, such a biopharmaceuticals, use liquid chromatography systems to evaluate their reactions or their manufacturing process lines. For example, drug manufacturers can use a liquid chromatography system to monitor their process line by taking samples at various times or at different points along the process line to ensure that a manufacturing batch is being created to specification. Other manufacturers may use their liquid chromatography systems to profile a certain biochemical reaction, taking samples from the same point in the process line over time as the reaction progresses.

Typically, however, the manner of acquiring samples for analysis is manually intensive; an individual takes a sample manually from a process line, carries the sample into the liquid chromatography system, and loads it for injection and analysis. Throughout the handling of the sample, care must be taken to label the sample properly and to ensure a well-documented chain of custody, or otherwise risk introducing uncertainty into the results. In addition, if the sample needs diluting before injection, the individual must first wash any container within which the dilution occurs to avoid contamination with previously used samples. Moreover, a manually prepared dilution can be wasteful of sample, which can oftentimes be an expensive commodity.

SUMMARY

In one aspect, the invention features an online sample manager of a liquid chromatography system comprising a fluidic tee having a first inlet port, a second inlet port, and an outlet port. A diluent pump moves diluent from a diluent source to the first inlet port of the fluidic tee. A valve has a fluidic intake port connected to a process source for acquiring a process sample therefrom. A pumping system moves the acquired process sample from the valve into the second inlet port of the fluidic tee where the process sample merges with the diluent arriving at the first inlet port to produce a diluted process sample that flows out from the outlet port of the fluidic tee.

In another aspect, the invention features a liquid chromatography system, comprising a solvent delivery system producing a solvent stream, and an online sample manager in fluidic communication with the solvent delivery system to receive the solvent stream therefrom and to introduce a diluted process sample into the solvent stream. The sample manager includes a fluidic tee having a first inlet port, a second inlet port, and an outlet port. A diluent pump moves diluent from a diluent source to the first inlet port of the fluidic tee. A valve has a fluidic intake port connected to a process source for acquiring a process sample therefrom. A pumping system moves the acquired process sample from the valve into the second inlet port of the fluidic tee where the process sample merges with the diluent arriving at the first inlet port to produce a diluted process sample that flows out from the outlet port of the fluidic tee.

In still another aspect, the invention features a method for sampling a process source. The method comprises connecting a fluidic intake port of a valve to a process source. Diluent is moved from a diluent source to a first inlet port of a fluidic tee. A process sample, acquired from the process source, is moved from the fluidic intake port of the valve into a second inlet port of the fluidic tee where the process sample merges with the diluent and produces a diluted process sample. The diluted process sample is moved from an outlet port of the fluidic tee to an injection site where the diluted process sample can be introduced to a solvent stream.

BRIEF DESCRIPTION OF THE DRAWINGS

The above and further advantages of this invention may be better understood by referring to the following description in conjunction with the accompanying drawings, in which like numerals indicate like structural elements and features in various figures. The drawings are not necessarily to scale, emphasis instead being placed upon illustrating the principles of the invention.

DETAILED DESCRIPTION

Online sample managers described herein have particular application in process (manufacturing) environments for purposes of process evaluation and in research environments for purposes of monitoring and characterizing reactions. As used herein, "online" means that the sample manager is connected directly to a process (or production) line to acquire samples automatically from the process line in approximately real time without manual intervention, then dilute, load, and inject the acquired process samples for subsequent chromatographic analysis. The chromatographic analysis thus occurs in parallel to the continued operation of the process line. It is to be understood that no distinction is being made here between a production line and a process line, both terms being used herein interchangeably, both terms being specific examples of process sources from which online sample managers, such as those described herein, can directly and automatically collect process samples.

In contrast, an "at-line" system means that the system is physically near but unconnected to the process line from which an individual acquires a process sample manually, carries and places the process sample into the system for processing; whereas an "in-line" system is one that is physically incorporated within the process line itself (the chromatographic analysis and process line operations in this instance are akin to serial processing).

Advantageously, the online system described herein does not require a separate container within which to perform the dilution. Rather, the dilution occurs within the plumbing (i.e., tubing and other internal components) of the sample manager by merging the acquired process sample with the diluent stream. Hence, no separate container need be washed to avoid contamination with a previously acquired and diluted sample. As another advantage, the online system uses smaller amounts of sample than dilutions traditionally executed within a container.

Figure 1:
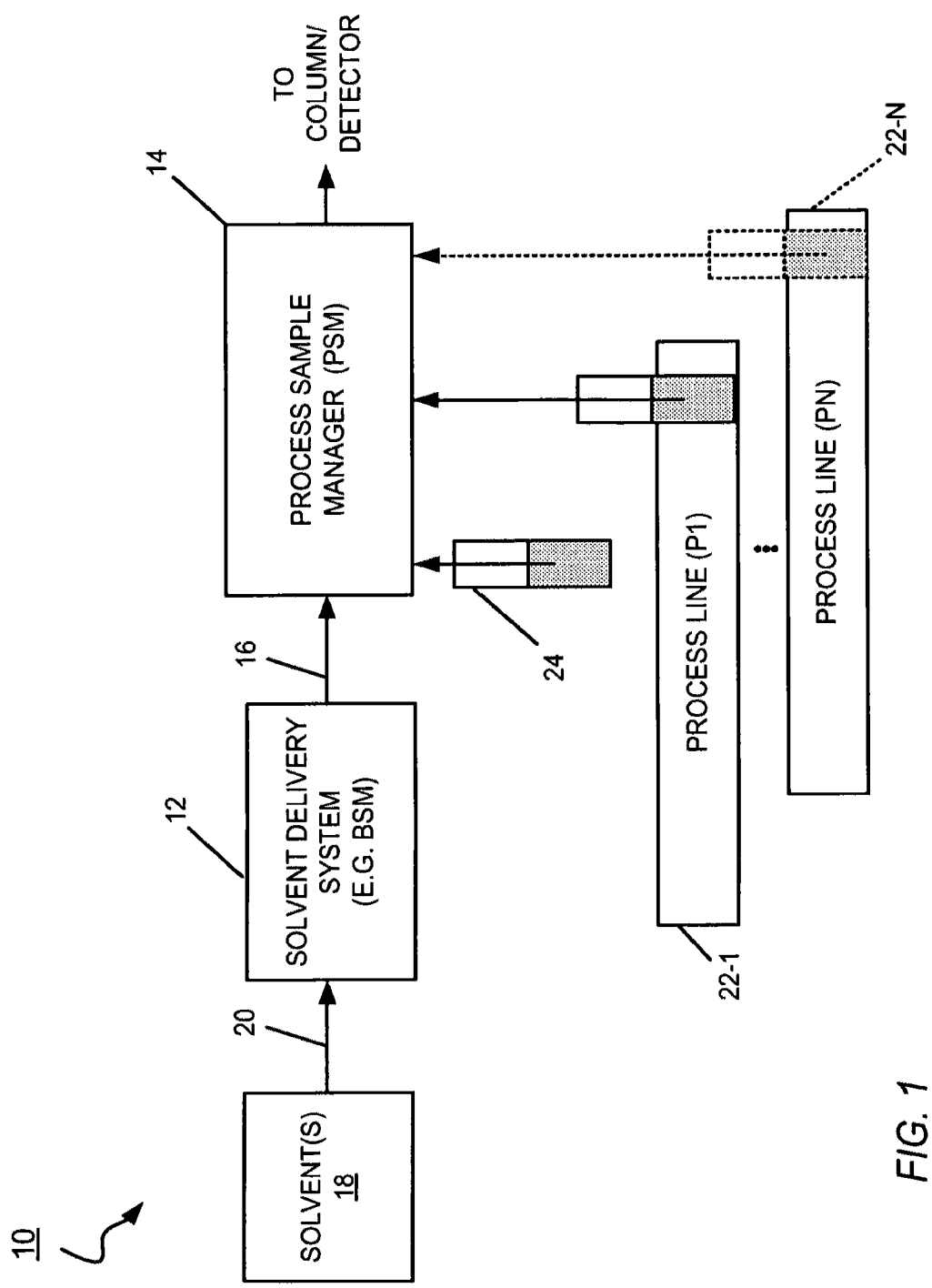
FIG. 1 is a functional block diagram of an embodiment of a liquid chromatography system having an online sample manager.

FIG. 1 shows an embodiment of an online liquid chromatography system 10 for separating a mixture into its constituents. The liquid chromatography system 10 includes a solvent delivery system 12 in fluidic communication with a sample manager 14 (herein, also called process sample manager or PSM) through tubing 16. Generally, the solvent delivery system 12 includes pumps (not shown) in fluidic communication with solvent reservoirs 18 from which the pumps draw solvents through tubing 20. In one embodiment, the solvent delivery system 12 is a binary solvent manager (BSM), which uses two individual serial flow pumps to draw solvents from their reservoirs 18 and deliver a solvent composition to the PSM 14. An example implementation of a BSM is the ACQUITY® UPLC Binary Solvent Manager, manufactured by Waters Corp. of Milford, Mass.

The PSM 14 is in fluidic communication with process lines 22-1, 22-N (generally, 22) to which the PSM is directly connected by tubing and from which the PSM automatically acquires process samples. In general, a process line is a representative example of a process source from which samples can be automatically acquired. Examples of process lines include drug manufacturing processes, beaker reactions, exit line (cleaning validation), reaction chamber, and fermentation reactions.

Although shown as acquiring process samples from multiple different process lines, the PSM 14 can acquire process samples from just one production line and may be connected thereto to acquire process samples at different stages (location and/or time-based) of that one process line. For example, the PSM can acquire samples from a process line at different time intervals in order to monitor the progress of a chemical reaction.

In addition, the PSM 14 is in fluidic communication with a source of diluent 24, used to dilute acquired process samples, and with a chromatographic column of particulate matter or with a detector (e.g., a mass spectrometer), for receiving an elution comprised of a diluted process sample combined with the solvent composition stream arriving from the solvent delivery system 12.

The liquid chromatography system 10 further includes a data system (not shown) that is in signal communication with the solvent delivery system 12 and the PSM 14. The data system has a processor and a switch (e.g., an Ethernet switch) for handling signal communication between the solvent delivery system 12 and PSM 14. In addition, the data system is programmed to implement the various phases of operation performed by the PSM (e.g., turning pumps on and off, rotating valves) in order to automatically acquire and dilute a process sample and introduce the diluted process sample to a solvent composition stream, as described herein. In addition, a host computing system (not shown) is in communication with the data system, by which personnel can download various parameters and profiles to affect the data system's performance.

Figure 2:
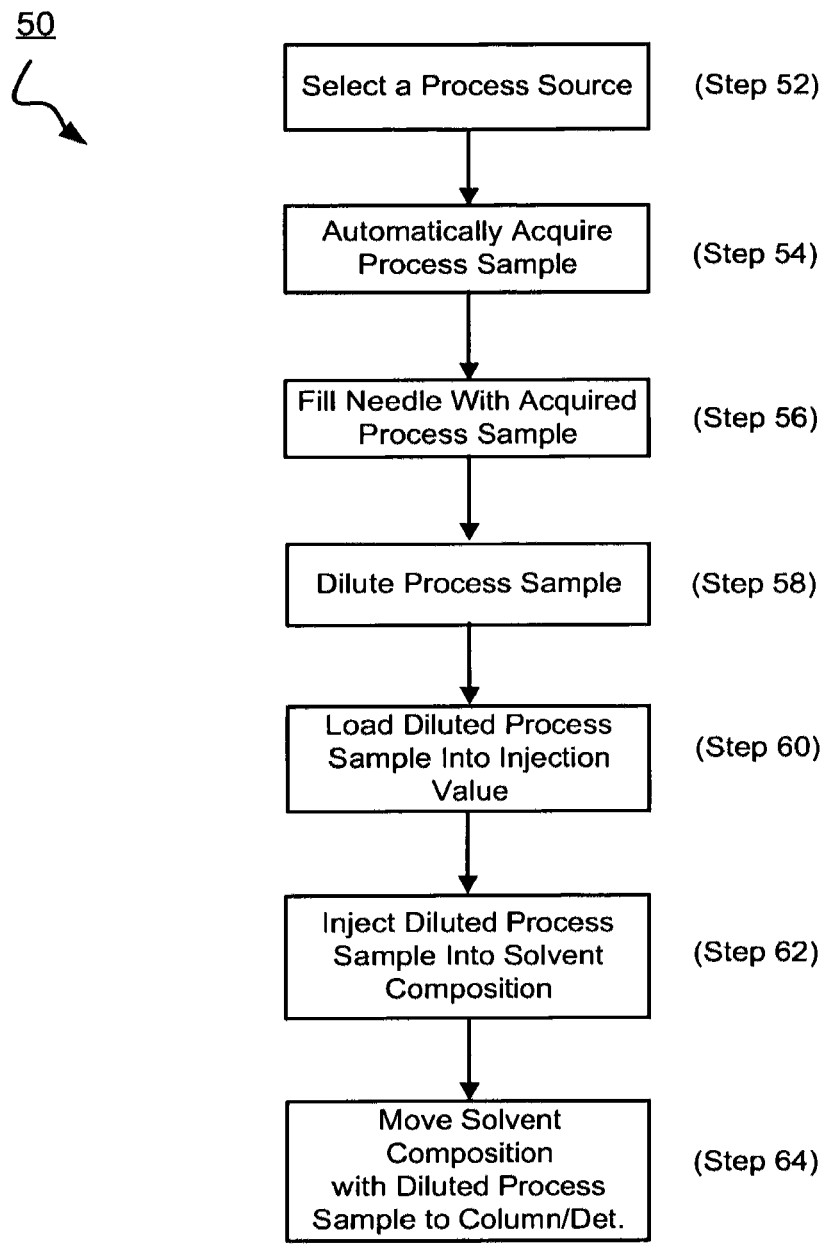
FIG. 2 is flow diagram of an embodiment of a process for automatically acquiring and diluting a process sample online and introducing the diluted process sample to a solvent composition stream.

FIG. 2 shows an embodiment of a method 50 for automatically acquiring and diluting a process sample online and introducing the diluted process sample to a solvent composition stream. In brief overview, at step 52, a sample is selected from a process source that is directly connected by tubing to the PSM 14. As described in more detail below, the PSM can be directly connected to multiple process sources, from which one source is selected. The PSM 14 automatically acquires (step 54) a process sample from the selected process source. The process sample is moved (step 56) into an injection needle within the PSM. The process sample is dispensed from the injection needle and diluted (step 58) with a diluent within the plumbing of the PSM. The dilution, comprised of the process sample and diluent, is pumped towards and loaded (step 60) into an injection valve, where the diluted process sample is introduced (step 62) to a solvent composition stream provided by the solvent delivery system 12. The solvent composition stream, now containing the diluted process sample, flows (step 64) to the column (and/or a detector).

Figure 3:
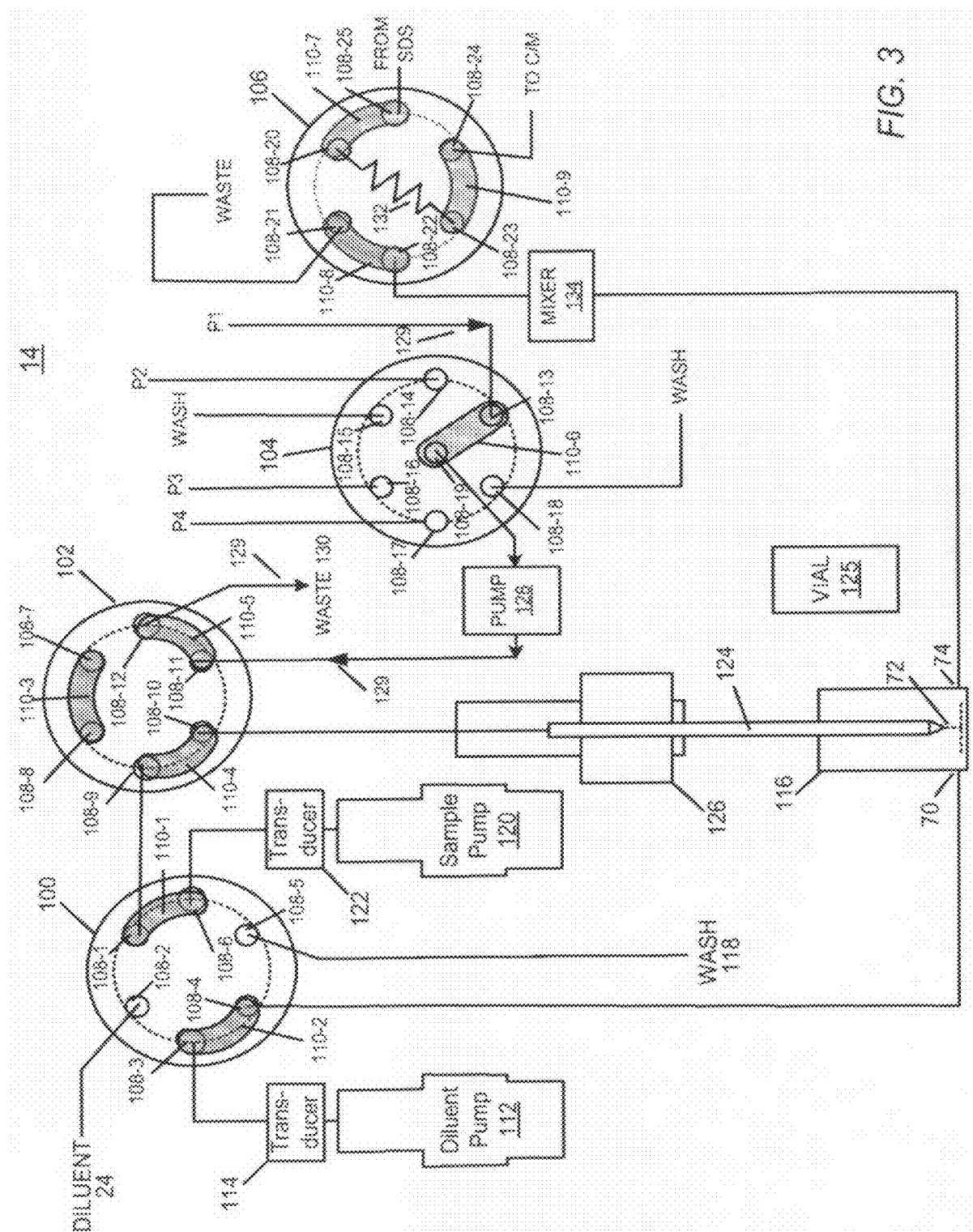
FIG. 3 is a functional diagram of an embodiment of a sample manager configured to acquire a process sample from a selected process line.

FIG. 3 shows an oversimplified diagram of one embodiment of the PSM 14 including a priming valve 100, a sampling valve 102, a process-selection valve 104, and an injection valve 106. In one embodiment, each valve is a separate, independently operable rotary valve having a plurality of fluidic ports 108 and one or more flow-through conduits 110. Although described primarily as rotary valves, any one or more of the priming, sampling, process-selection, and injection valves can be implemented using other types of valves, examples of which include, but are not limited to, slider valves, solenoids, and pin valves. Each flow-through conduit 110 provides a pathway between a pair of neighboring fluidic ports (the flow-through conduit of the process-selection valve 104 being an exception, as described in more detail below). When a given valve rotates, its flow-through conduits move clockwise or counterclockwise, depending upon the valve's direction of rotation. This movement operates to switch the flow-through conduit to a different pair of neighboring fluidic ports, establishing a fluidic pathway between that different pair while removing the pathway from the previously connected pair of fluidic ports.

In FIG. 3, the various valves 100, 102, 104, and 106 are configured to select a process line, acquire a process sample from the selected process line, and bring the process sample into the process sample manager 14. This configuration is referred to herein as a sample-selection configuration.

The priming valve 100 has six fluidic ports 108-1, 108-2, 108-3, 108-4, 108-5, and 108-6 and two flow-through conduits 110-1, 110-2. Tubing connects the fluidic port 108-1 to the fluidic port 108-9 of the sampling valve 102, the fluidic port 108-2 to the diluent source 24, the fluidic port 108-3 to a diluent pump 112 through a transducer 114, and the fluidic port 108-4 with a fluidic tee 116.

The fluidic tee 116 has a first inlet port 70, coupled in this embodiment to receive the diluent, a second inlet port 72 into which to inject the process sample (hereafter also called the injection port), and an outlet port 74. Example implementations of fluidic tees are described in U.S. Pat. No. 7,754,075, issued Jul. 13, 2010, the entirety of which patent is incorporated by reference herein.

In addition, the fluidic port 108-5 is connected by tubing to a source of wash 118, and the fluidic port 108-6 is connected by tubing to a sample pump 120 through a transducer 122. In this sample-selection configuration, the flow-through conduit 110-1 provides a fluidic pathway between fluidic ports 108-1 and 108-6, and the flow-through conduit 110-2 provides a fluidic pathway between fluidic ports 108-3 and 108-4.

The sampling valve 102 has six fluidic ports 108-7, 108-8, 108-9, 108-10, 108-11, 108-12 and three flow-through conduits 110-3, 110-4, and 110-5. In this embodiment, fluidic ports 108-7 and 108-8 are unused and plugged. Tubing connects the fluidic port 108-9 to the fluidic port 108-1 of the priming valve 100 and the fluidic port 108-10 to an injection needle 124.

The injection needle 124 has a tip that moves in and out of the injection port 72 under the control of a needle drive 126. The injection port 72 produces a leak-proof seal when the tip enters therein. In addition to controlling the movement and position of the injection needle 124 (into and out of the injection port 72), the needle drive 126 can also move the injection needle in an angular direction (theta motion) between a vial 125 and the injection port 72.

Tubing connects the fluidic port 108-11 to one end of a pump 128, and the fluidic port 108-12 to a reservoir used for collecting waste 130. This pump 128 can be a unidirectional or bidirectional peristaltic pump or a milliGAT pump. In the sample-selection configuration, the flow-through conduit 110-5 provides a fluidic pathway between fluidic ports 108-11 and 108-12, thereby providing a continuous fluidic pathway between the pump 128 and the waste reservoir 130.

The process-selection valve 104 has six fluidic intake ports 108-13, 108-14, 108-15, 108-16, 108-17, and 108-18, a fluidic outlet port 108-19, and one flow-through conduit 110-6. The flow-through conduit 110-6 couples the fluidic outlet port 108-19, which is concentric to the process-selection valve 104, to a selected process line. When the valve rotates, the flow-through conduit 110-6 remains coupled at one end to the fluidic outlet port 108-19 irrespective of the valve's direction of rotation, and, at its other end, newly couples to a different fluidic intake port. This rotation thus serves to select a different process source (i.e., the one connected to that fluidic intake port) by coupling it to the fluidic outlet port 108-19, and to deselect the previously selected process source.

In general, the process-selection valve 104 enables six lines to be connected as the user sees fit. In this embodiment, for example, four of the fluidic intake ports 108-13, 108-14, 108-16, and 108-17 are connected to different process lines: tubing connects fluidic intake port 108-13 to a first process line (P1), fluidic intake port 108-14 to a second process line (P2), fluidic intake port 108-16 to a third process line (P3), and fluidic intake port 108-17 to a fourth process line (P4). The other fluidic intake ports 108-15 and 108-18 are connected to wash sources, used to clear the pump and the tubing of any acquired process sample material when desired (e.g., between process sample acquisitions). The fluidic outlet port 108-19 is connected by tubing to an ingress end of the pump 128.

The injection valve 106 has six fluidic ports 108-20, 108-21, 108-22, 108-23, 108-24, and 108-25, three flow-through conduits 110-7, 110-8, 110-9, and a sample loop 132. One end of the sample loop 132 is connected to the fluidic port 108-20, and the other end of the sample loop 132 is connected to the fluidic port 108-23. Tubing connects the fluidic port 108-24 to the column (C/M), the fluidic port 108-25 to the solvent delivery system 12 (FIG. 1), the fluidic port 108-21 to a waste-collecting reservoir, and the fluidic port 108-22 to an egress end of a mixer 134. In one embodiment, the capacity of the mixer 134 is 10 uL.

With the injection valve 106 in the sample-selection configuration, the flow-through conduit 110-7 provides a fluidic pathway between fluidic ports 108-20 and 108-25; the flow-through conduit 110-8 provides a fluidic pathway between fluidic ports 108-21 and 108-22; and the flow-through conduit 110-9 provides a fluidic pathway between fluidic ports 108-23 and 108-24.

When the PSM is in the sample-selection configuration, the individual configurations of the sampling valve 102 and process-selection valve 104 together provide a continuous fluidic pathway from the selected process line P1 and the waste reservoir 130. The flow-through conduit 110-6 of the process-selection valve 104 provides a fluidic pathway between fluidic intake port 108-13 and fluidic outlet port 108-19, thereby placing the pump 128 in fluidic communication with the process line P1, and the flow-through conduit 110-5 of the sampling valve 102 provides a pathway between fluidic port 108-11 and fluidic port 108-12, which is connected by tubing to waste 130

To acquire a sample from the selected process line, here, for example, P1, the pump 128 is turned on, pulling the process sample from process line P1 through the flow-through conduit 110-7 and delivering the acquired process sample to the fluidic port 108-11 of the sampling valve 102. From the fluidic port 108-11, the process sample moves through the flow-through conduit 110-5 and out the fluidic port 108-12. After sufficient process sample has been drawn, the pump 128 is turned off. Typically, the pump 128 draws process sample in excess of the capacity of the pump and tubing. Such excess process sample flows into the waste reservoir 130. The arrows 129 in FIG. 3 show the flow of the process sample from the process P1 to the waste reservoir 130.

The other valves, namely, the priming valve 100 and the injection valve 106, are uninvolved in acquiring and bringing the process sample into the PSM 14.

Figure 4:
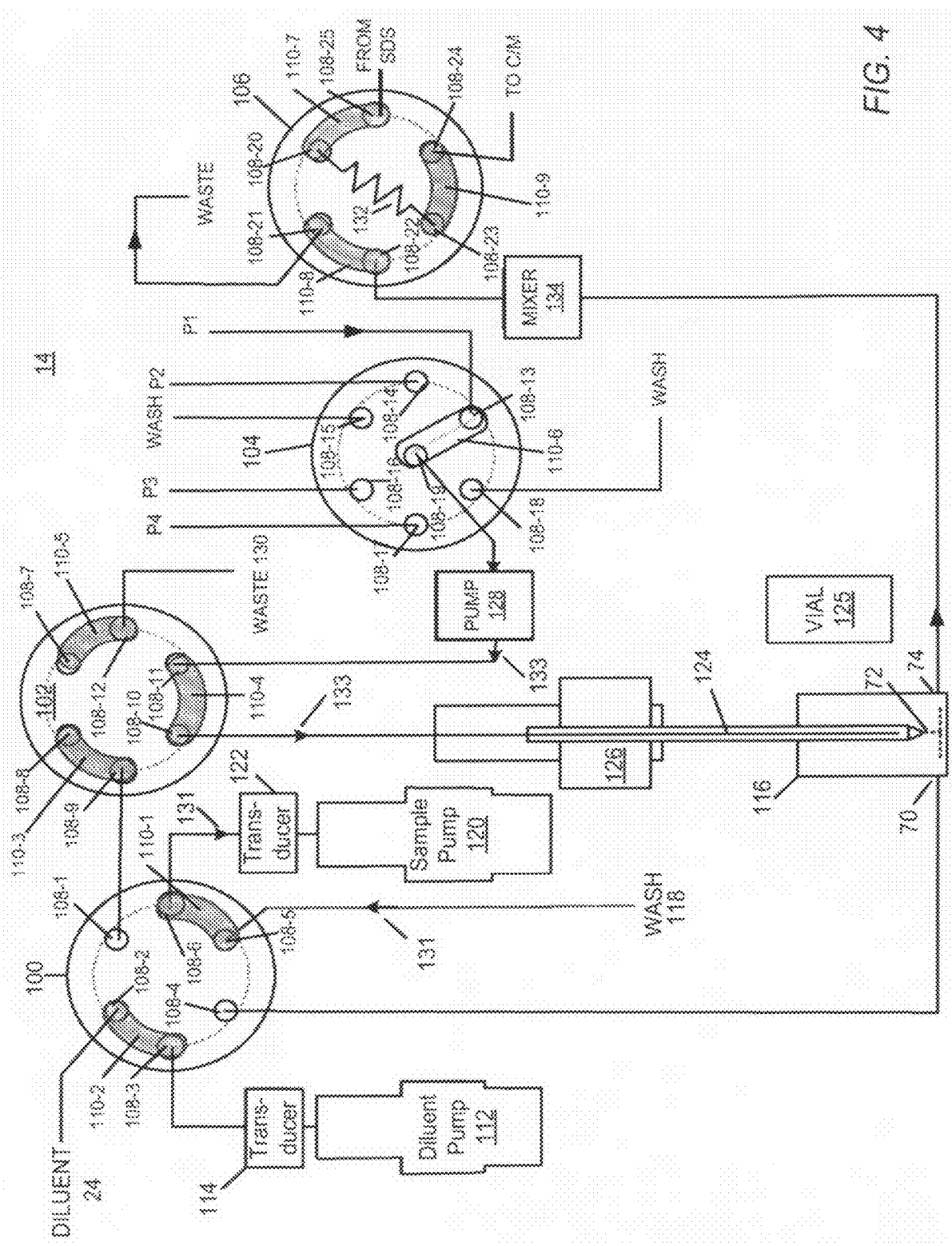
FIG. 4 is a functional diagram of the embodiment of the sample manager of FIG. 3 configured to fill a needle with the acquired process sample.

FIG. 4 shows the system of FIG. 3, with the valves configured to move the drawn process sample into the injection needle 124. The configurations of the process-selection valve 104 and injection valve 106 are unchanged from those of FIG. 3, whereas those of the priming valve 100 and the sampling valve 102 are changed. This configuration is referred to as a sample-draw configuration.

In comparison to the sample-selection configuration in FIG. 3, the priming valve 100 is turned clockwise by one port position such that the flow-through conduit 110-2 couples the fluidic port 108-2 to the fluidic port 108-3, effectively coupling the diluent pump 112 to the diluent source 24. The turning of the priming valve 100 also couples the fluidic port 108-5 to the fluidic port 108-6 via the flow-through conduit 110-1, thereby coupling the sample pump 120 to a source of wash 118. The sample pump 120 is turned on to draw in wash and purge the sample pump 120, as indicated by arrows 131.

The sampling valve 102 is turned clockwise by one port position (alternatively, a counterclockwise rotation achieves an equivalent configuration) such that the flow-through conduit 110-4 couples the fluidic port 108-10 to the fluidic port 108-11, and thereby fluidically couples the pump 128 to the injection needle 124. As indicated by arrows 133, operation of the pump 128 pushes the process sample acquired from the selected process line (here, P1) into the injection needle (the injection needle is raised out of the injection port at this time; any overfill of the injection needle is captured as waste).

While the needle fills with process sample, the flow-through conduit 110-3 couples the fluidic port 108-8 to the fluidic port 108-9, while the flow-through conduit 110-5 couples the fluidic port 108-7 to the fluidic port 108-12. Because both fluidic ports 108-7 and 108-8 are plugged, these connections provide no pathways for fluidic flow.

Figure 5:
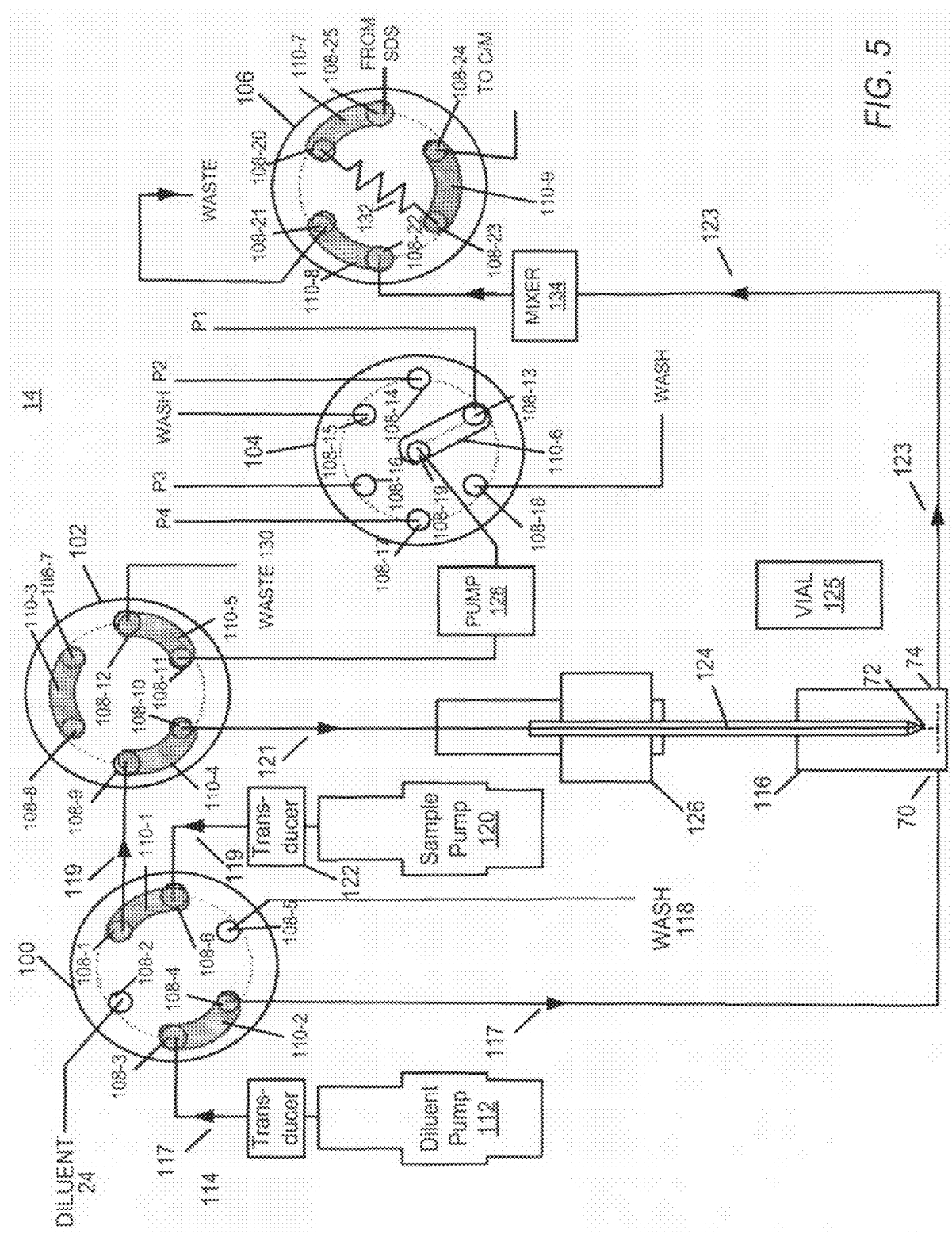
FIG. 5 is a functional diagram of the embodiment of the sample manager of FIG. 3 configured to dilute the acquired process sample.

FIG. 5 shows the PSM 14 of FIG. 3 with the valves configured to dilute the acquired process sample. The configurations of the process-selection valve 104 and injection valve 106 are unchanged from those of FIG. 4, whereas those of the priming valve 100 and the sampling valve 102 are changed. This configuration is referred to as a sample-dilution configuration.

In comparison to the sample-draw configuration of FIG. 4, the priming valve 100 is turned counterclockwise by one port position (i.e., back to the configuration of FIG. 3). In this sample-dilution configuration, the flow-through conduit 110-2 couples the fluidic port 108-3 to the fluidic port 108-4, thereby fluidically coupling the diluent pump 112 to the tubing connected to the fluidic tee 116. The operation of the diluent pump 112 now pushes the drawn diluent through the tubing to the first inlet port 70 of the fluidic tee 116 in the direction illustrated by arrows 117.

Also in comparison to the sample-draw configuration of FIG. 4, the sampling valve 102 is rotated by one port position (e.g., back to the configuration of FIG. 3). In this sample-dilution configuration, the flow-through conduit 110-4 couples the fluidic port 108-9 to the fluidic port 108-10, which, together with the flow-through conduit 110-1 of the priming valve 100 coupling the fluidic port 108-6 to the fluidic port 108-1, provides a continuous fluidic pathway between the sample pump 120 and the injection needle 124.

With the needle drive 126 positioning the injection needle 124 in the injection port 72, operation of the sample pump 120 pushes the previously drawn wash 118 through the flow-through conduit 110-1 and into the injection needle 124 (the end opposite the needle's tip), as illustrated by arrows 119. The wash 118 displaces the process sample within the injection needle 124, causing the process sample within the injection needle to enter the fluidic tee 116, as illustrated by arrow 121.

The fluidic tee 116 operates to merge the diluent stream arriving at the first inlet port 70 with the process sample stream arriving at the injection port 72. The resulting dilution leaves the fluidic tee 116 through the outlet port 74 and travels to the mixer 134, as illustrated by arrows 123. The mixer 134 further homogenizes the dilution before the dilution arrives at the fluidic port 108-22 of the injection valve 106. Any overfill of dilution passes to waste from the fluidic port 108-22 through the flow-through conduit 110-8 and out through the fluidic port 108-21.

During dilution of the process sample, the diluent pump 112 and the sample pump 120 move fluids concurrently. The flow rates of these pumps determine the dilution ratio (overall dilution flow rate to process sample flow rate). Consider, for example, an overall dilution flow rate of 100 ul/min, with the sample pump 120 pushing 10 ul/min while the diluent pump pushes 90 ul/min: the result is a 10:1 dilution. When, for example, the sample pump 120 pushes 50 ul/min, while the diluent pump pushes 50 ul/min, the result is a 2:1 dilution.

Figure 6:
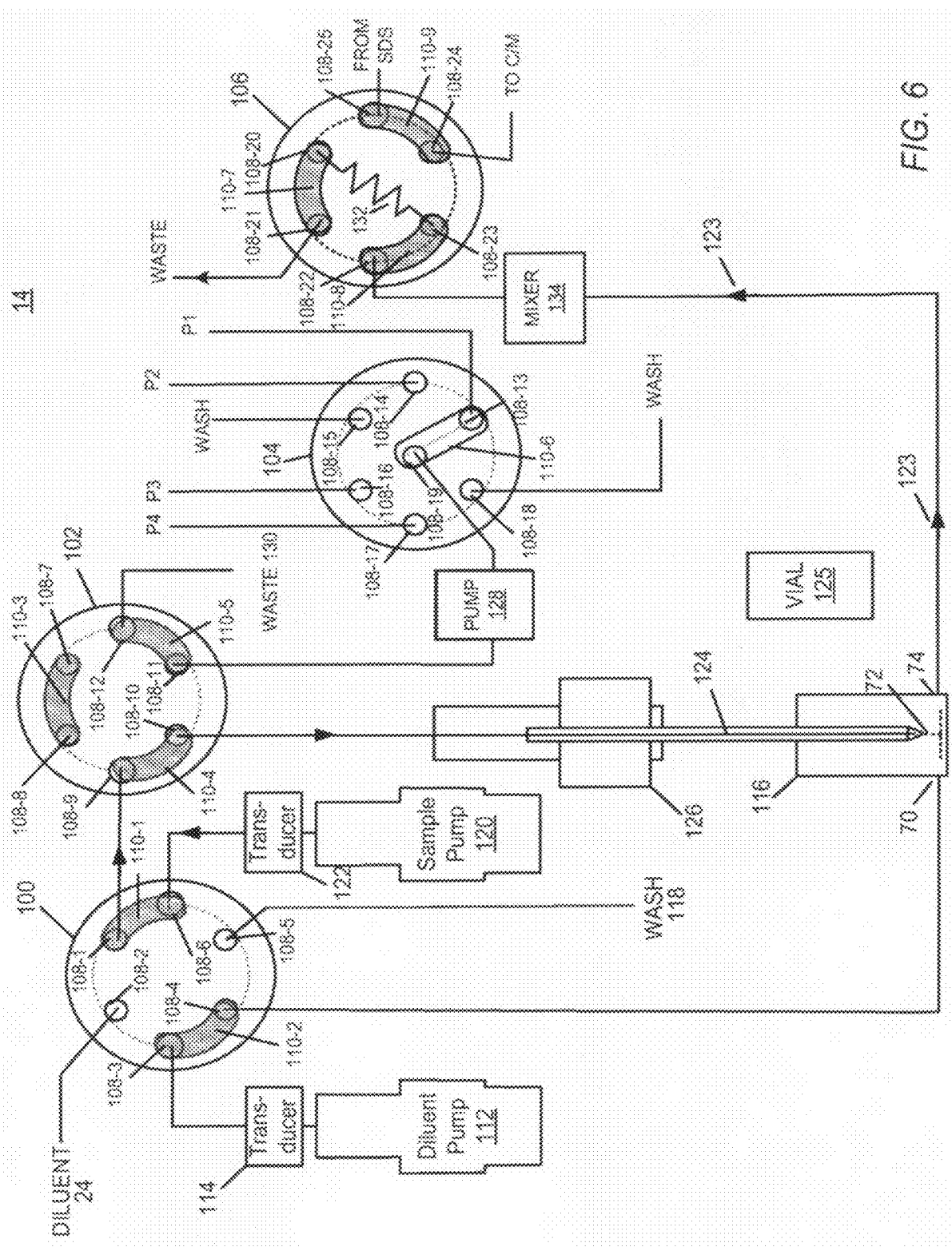
FIG. 6 is a functional diagram of the embodiment of the sample manager of FIG. 3 configured to load the diluted process sample in an injection valve.

FIG. 6 shows the system of FIG. 3, with the valves configured to load the diluted process sample into the sample loop 132 within the injection valve. The configurations of the priming valve 100, the sampling valve 102, and process-selection valve 104 are unchanged from those of FIG. 5, whereas that of the injection valve 106 is changed.

When loading the diluted process sample, the injection valve 106 is rotated counterclockwise by one port position from its position in FIG. 5 such that the flow-through conduit 110-8 couples the fluidic port 108-22 to the fluidic port 108-23, thereby fluidically coupling one end of the sample loop 132 to the mixer 134. Continued operation of the sample pump 120 pushes the dilution into the sample loop 132, as illustrated by arrows 127 (the diluent pump 112 is turned off). The rotation of the injection valve 106 also positions the flow-through conduit 110-7 to couple the fluidic port 108-20 to the fluidic port 108-21, thereby providing a continuous fluidic pathway from the mixer 134 to waste, for capturing any overfill of the sample loop 132.

Figure 7:
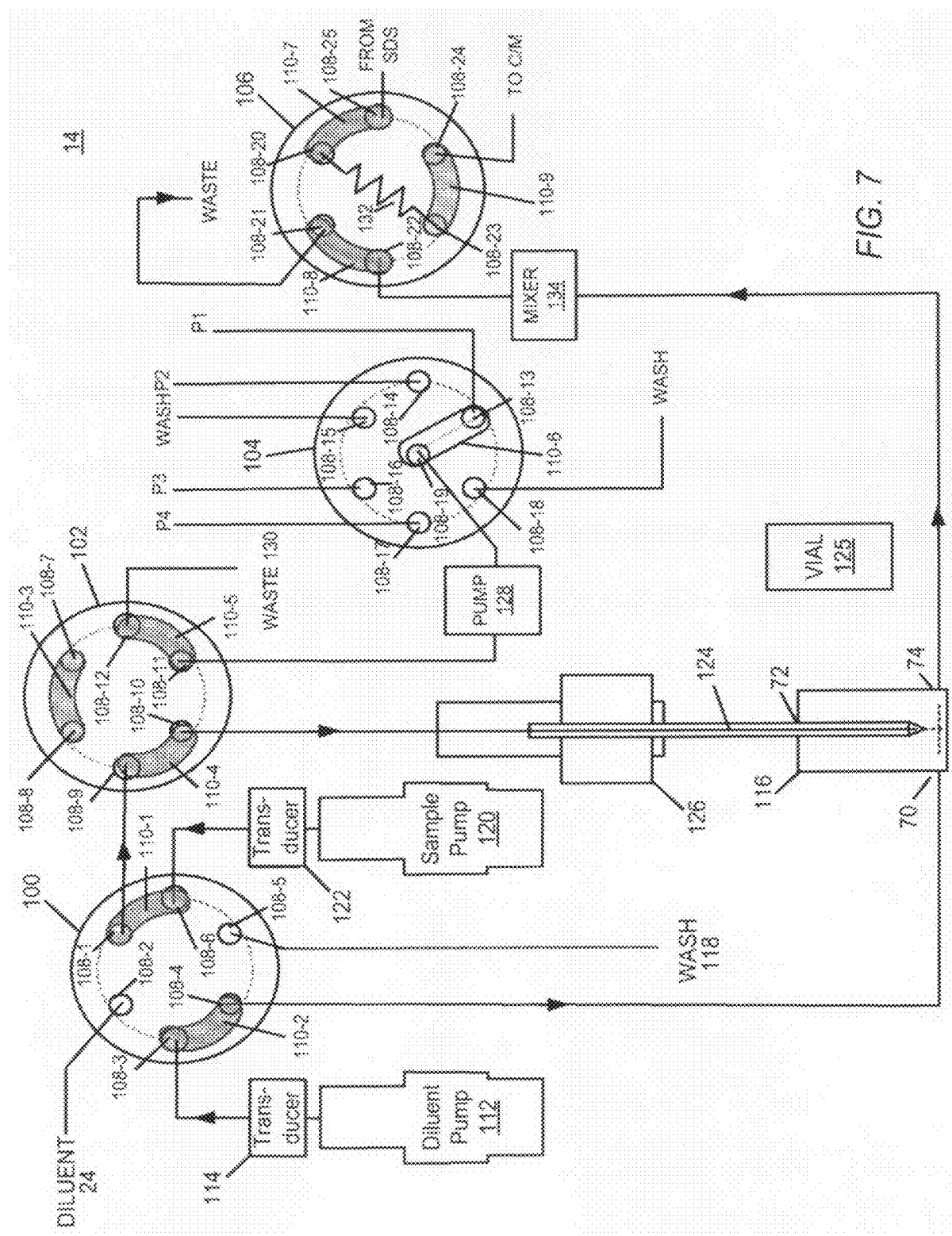
FIG. 7 is a functional diagram of the embodiment of the sample manager of FIG. 3 configured to introduce the loaded diluted process sample into a solvent composition stream.

FIG. 7 shows the system of FIG. 3, with the valves configured to inject the process sample within the sample loop into the solvent composition stream arriving at the injection valve from the solvent delivery system. The configurations of the priming valve 100, the sampling valve 102, and process-selection valve 104 are unchanged from those of FIG. 6, whereas that of the injection valve 106 is changed. To introduce the diluted process sample to the solvent composition stream, the injection valve 106 is rotated clockwise by one port position from its position of FIG. 6 (i.e., back to the position of FIG. 5) such that the flow-through conduit 110-7 couples the fluidic port 108-20 to the fluidic port 108-25 and the flow-through conduit 110-9 couples the fluidic port 108-23 to the fluidic port 108-24. This configuration places the full length of the sample loop 132, and thus the diluted process sample contained therein, in the path of the solvent composition stream arriving from the solvent delivery system, thereby introducing the process sample to the solvent composition. During this phase, the injection needle 124 is lowered in the injection port 72, and the diluent pump 112 and sample pump 120 are both pumping. The diluent pump washes its fluidic circuit with wash solvent and ends the phase with a fill cycle. The sample pump washes its fluidic circuit with sample and ends the phase empty.

Figure 8:
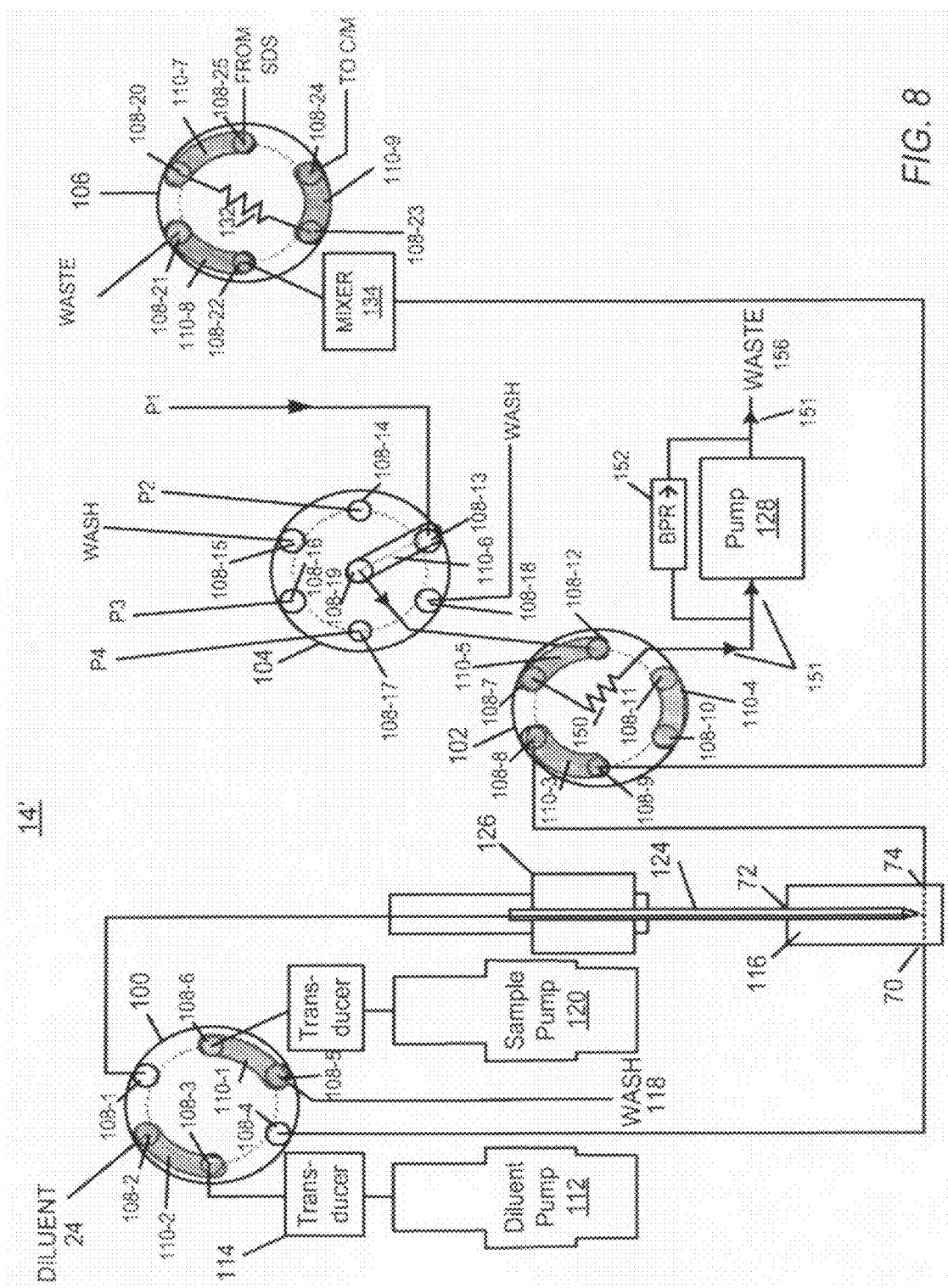
FIG. 8 is a functional diagram of another embodiment of a sample manager configured to acquire a process sample from a selected process line.

FIG. 8 shows a functional block diagram of another embodiment of a process sample manager 14' including the priming valve 100, sampling valve 102, process-selection valve 104, and injection valve 106 described in connection with the embodiment shown in FIG. 3. Unless specifically mentioned, the other components of the process sample manager 14', such as the fluidic tee 116, injection needle 124, needle drive 126, mixer 134, and pumps 112, 120, 128, are equivalent to their counterparts described in connection with the embodiment shown in FIG. 3. Again, although described primarily as rotary valves, any one or more of the priming, sampling, process-selection, and injection valves can be implemented using other types of valves, examples of which include, but are not limited to, slider valves, solenoids, and pin valves. One variation, the process sample manager 14' includes a back pressure regulator (BPR) 152 connected across the pump 128. Another variation is the use of a loop 150 to hold a particular volume of process sample when initially acquired from a selected process line. Other variations from the embodiment shown in FIG. 3 relate to the tubing interconnecting the various components, as described further below.

In FIG. 8, the various valves 100, 102, 104, and 106 are configured to select a process line, acquire a process sample from the selected process line, and introduce the process sample into the process sample manager 14'. This configuration is referred to generally as a sample-selection configuration.

Referring to the priming valve 100, tubing connects the fluidic port 108-1 to one end (opposite the tip) of the injection needle 124. In addition, the fluidic port 108-2 is connected by tubing to the diluent source 24, the fluidic port 108-3 by tubing to the diluent pump 112 through the transducer 114, and the fluidic port 108-4 by tubing to the first inlet port 70 of the fluidic tee 116. The fluidic port 108-5 of the priming valve 100 is connected by tubing to the wash 118, and the fluidic port 108-6 is connected by tubing to the sample pump 120 through the transducer 122.

When the priming valve is in this sample-selection configuration, the flow-through conduit 110-1 provides a fluidic pathway between fluidic ports 108-5 and 108-6, and thereby couples the sample pump 120 to the wash 118, while the flow-through conduit 110-2 provides a fluidic pathway between fluidic ports 108-2 and 108-3, to couple the diluent pump 112 to the diluent 24.

Referring to sampling valve 102, tubing connects the fluidic port 108-7 to one end of the pump 128, the fluidic port 108-8 to the outlet port 74 of the fluidic tee 116, the fluidic port 108-9 to an inlet side of the mixer 134, and the fluidic port 108-12 to the fluidic outlet port 108-19 of the process-selection valve 104.

With the sampling valve 102 in the sample-selection configuration, the flow-through conduit 110-3 provides a fluidic pathway between fluidic ports 108-8 and 108-9, thereby providing a continuous fluidic pathway between the outlet port 74 of the fluidic tee 116 and the inlet side of the mixer 134. The flow-through conduit 110-5 provides a fluidic pathway between fluidic ports 108-7 and 108-12, thereby providing a continuous fluidic pathway extending from the pump 128 through the sample valve 102 and process-selection valve 104 to the selected process line (here, P1).

Referring to the process-selection valve 104, tubing connects fluidic intake port 108-13 to the first process line (P1), fluidic intake port 108-14 to a second process line (P2), fluidic intake port 108-16 to a third process line (P3), and fluidic intake port 108-17 to a fourth process line (P4). Fluidic intake ports 108-15 and 108-18 are connected to wash sources, used, when desired, to clear the pump 128 and the tubing of any acquired process sample material. As previously mentioned, the fluidic outlet port 108-19 of the process-selection valve 104 is connected by tubing to the fluidic port 108-7 of the sampling valve 102. The flow-through conduit 110-6 couples this fluidic outlet port 108-19 to the selected process line, here, as an example, process line P1, to acquire a process sample stream therefrom. Again, in general, the process-selection valve 104 enables six lines to be connected as the user sees fit, and the connections shown in FIG. 8 are but one example.

Referring to the injection valve 106, tubing connects the fluidic port 108-24 to the column or detector (C/M), fluidic port 108-25 to the solvent delivery system 12 (FIG. 1), the fluidic port 108-21 to a waste-collecting reservoir, and fluidic port 108-22 to the egress side of the mixer 134. With the injection valve 106 in the sample-selection configuration, the flow-through conduit 110-7 provides a fluidic pathway between fluidic ports 108-20 and 108-25, the flow-through conduit 110-8 provides a fluidic pathway between fluidic ports 108-21 and 108-22, and the flow-through conduit 110-9 provides a fluidic pathway between fluidic ports 108-23 and 108-24.

When acquiring and introducing a process sample into the process sample manager 14', the injection needle 124 is positioned in the injection port 72 of the fluidic tee 116, and the process-selection valve 104 is set to the desired process line (here, e.g., process P1). The pump 128 is turned on to draw a process sample from the selected process line for a predetermined period (e.g., 30 seconds) at a predetermined flow rate (e.g., 15 ml/min). The process sample enters the process-selection valve 104 through the fluidic port 108-13, traverses the flow-through conduit 110-6, and exits through the fluidic port 108-19.

Proceeding through connective tubing, the process sample enters the sampling valve 102 at the fluidic port 108-12. From this fluidic port 108-12, the flow-through conduit 110-6 carries the process sample to the fluidic port 108-7. From the fluidic port 108-7, the process sample is drawn into the loop 150 by the pump 128. After the loop 150 fills with process sample, any excess passes through the pump 128 to waste 156.

Figure 9:
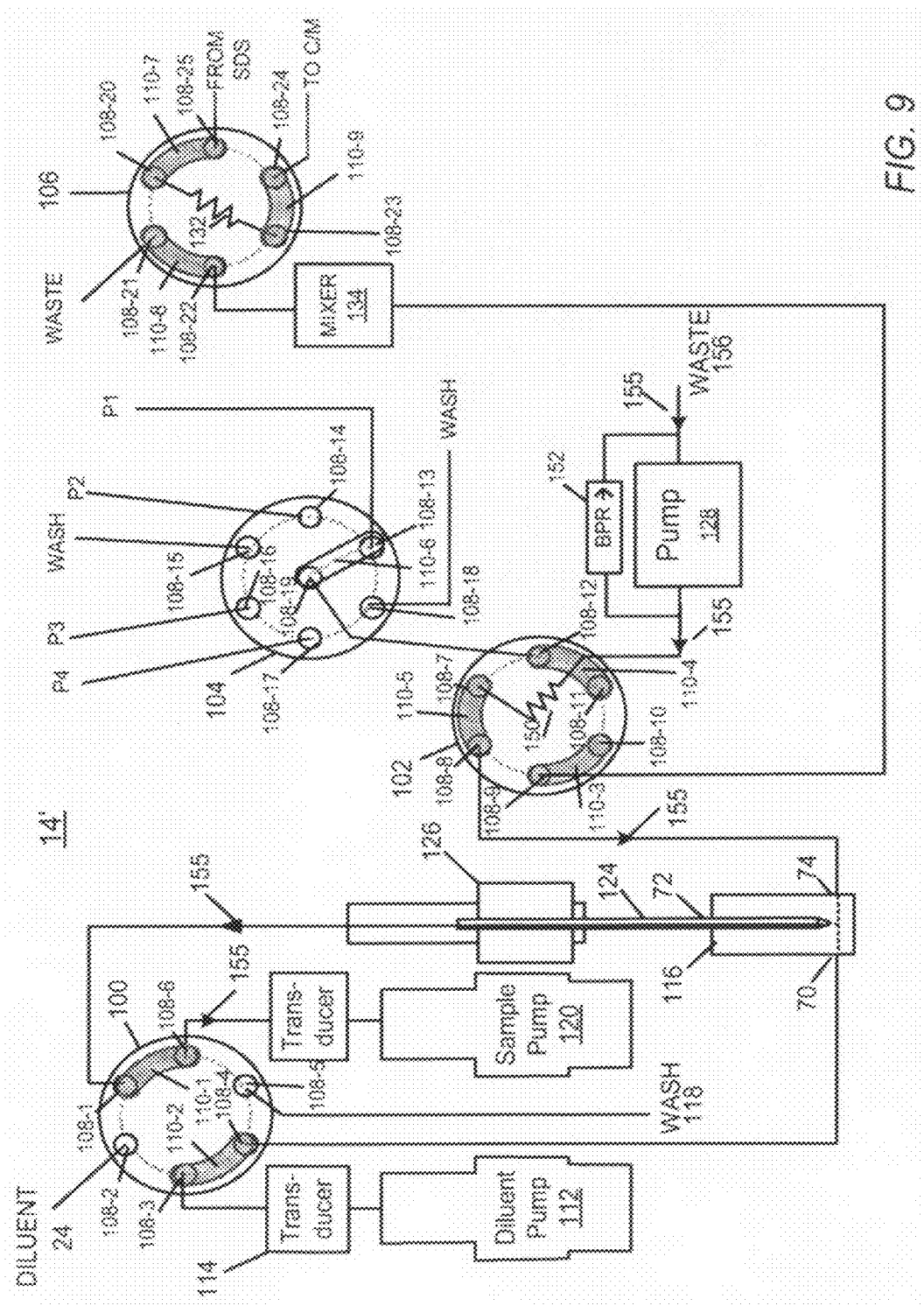
FIG. 9 is a functional diagram of the embodiment of the sample manager of FIG. 8 configured to fill a needle with the acquired process sample.

FIG. 9 shows the sample manager 14' of FIG. 8, with the valves configured to aspirate the process sample into the injection needle 124 through the needle's tip. The configurations of the process-selection valve 104 and injection valve 106 are unchanged from those of FIG. 8, whereas those of the priming valve 100 and sampling valve 102 are changed. This configuration is referred to as a sample-draw configuration.

With respect to the configuration of FIG. 8, the priming valve 100 is rotated counterclockwise by one port position such that the flow-through conduit 110-2 couples the fluidic port 108-3 to the fluidic port 108-4, thereby coupling the diluent pump 112 to the tubing connected to the fluidic tee 116. In addition, the flow-through conduit 110-1 couples the fluidic port 108-6 to the fluidic port 108-1. In addition, the sampling valve 102 is rotated clockwise by one port position from that of FIG. 8 (alternatively, it can be turned counterclockwise, and achieve the same configuration) such that the flow-through conduit 110-5 couples the fluidic port 108-7 to the fluidic port 108-8, thereby coupling the outlet port 74 of the tee 116 to the pump 128.

A valve within the tee 116 provides a fluidic pathway between the outlet port 74 and the injection port 72, while preventing any flow from the outlet port 74 to the inlet port 70. With the needle 124 disposed in the injection port 72, this configuration provides a continuous fluidic pathway from the pump 128 to the sample pump 120 that passes through the tip of the injection needle 124.

While in the sample-draw configuration, the pump 128 is on and pushes the process sample drawn from the selected P1 process line into the injection needle 124 through the needle's tip. Concurrently, the sample pump 120 is on and draws the process sample being pushed by the pump 128. The path taken by the process sample is represented by arrows 155.

With one pump 120 drawing while the other pump 128 pushes the process sample, if the flow rates of the pumps are not equal to each other, either a vacuum is generated in the tubing between the pumps 120, 128 (because the pump 120 draws faster than the pump 128 pushes) or the pressure rises (because the pump 128 faster than the pump 120 draws), neither of which is a desirable condition for proper operation of the PSM 14'. Accordingly, in one embodiment, the flow rates of the pumps are predetermined such that the pump 128 pushes at a greater rate than the pump 120 draws, and the BPR 152 ensures that any resulting increase in pressure within the tubing between the pumps 120, 128 cannot exceed a particular level. For example, the pump 128 can dispense 220 ul of process sample at 600 ul/min while the sample pump 120 draws 100 ul at 300 ul/min After the particular level of pressure is reached, the BPR 152 opens, and the pressure between the pumps 120, 128 remains constant thereafter.

Figure 10:
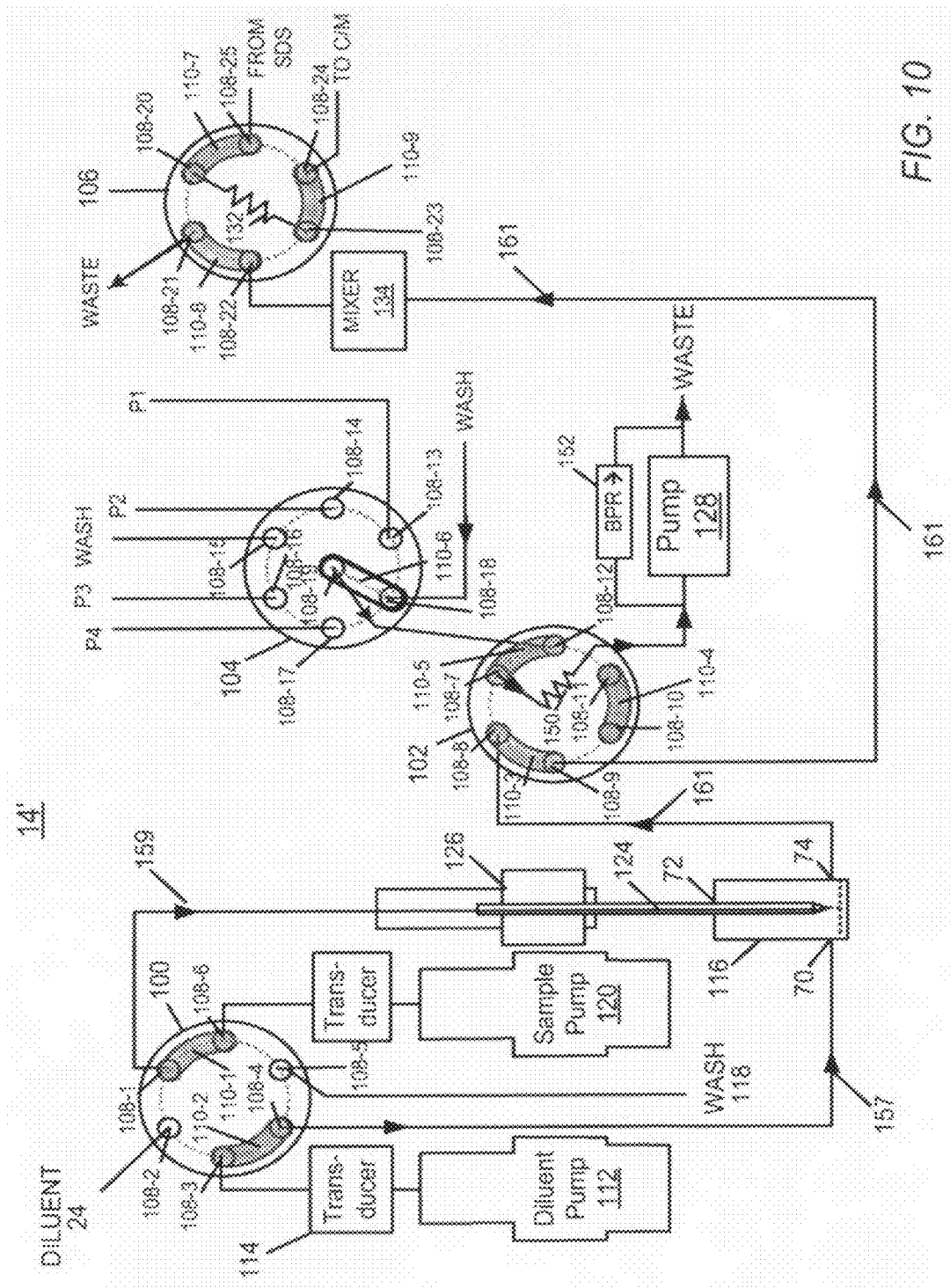
FIG. 10 is a functional diagram of the embodiment of the sample manager of FIG. 8 configured to dilute the acquired process sample.

FIG. 10 shows the sample manager 14' of FIG. 8, with the valves configured to dilute the aspirated process sample. The configurations of the priming valve 100, process-selection valve 104, and injection valve 106 are unchanged from those of FIG. 9, whereas that of the sampling valve 102 is rotated by one port position (e.g., back to the configuration of FIG. 8) such that the flow-through conduit 110-3 provides a fluidic pathway between fluidic ports 108-8 and 108-9, thus providing a continuous fluidic pathway from the outlet port 74 of the fluidic tee 116 through the sampling valve 102 to the mixer 134. The dilution of the process sample travels this pathway to reach the injection valve 106.

During dilution of the process sample, the sample pump 120 reverses the pumping direction used to draw the sample, and the diluent pump 112 and the sample pump 120 both push fluid concurrently: the diluent pump moves diluent, while the sample pump moves process sample. The flow rates of these pumps 112, 120 determine the dilution ratio (overall dilution flow rate to process sample flow rate). The operation of the diluent pump 112 dispenses the diluent to the fluidic tee 116, as indicated by arrow 157, while operation of the sample pump 120 dispenses the aspirated process sample to the injection port 72 of the fluidic tee 116, as indicated by arrow 159. A diluted process sample leaves the fluidic tee 116 through the outlet port 74, as indicated by arrow 161. From the mixer 134 the diluted process sample moves into the injection valve 106. Any excess diluted process sample can flow through flow-through conduit 108-8 of the injection valve 106 into a waste reservoir.

Figure 11:
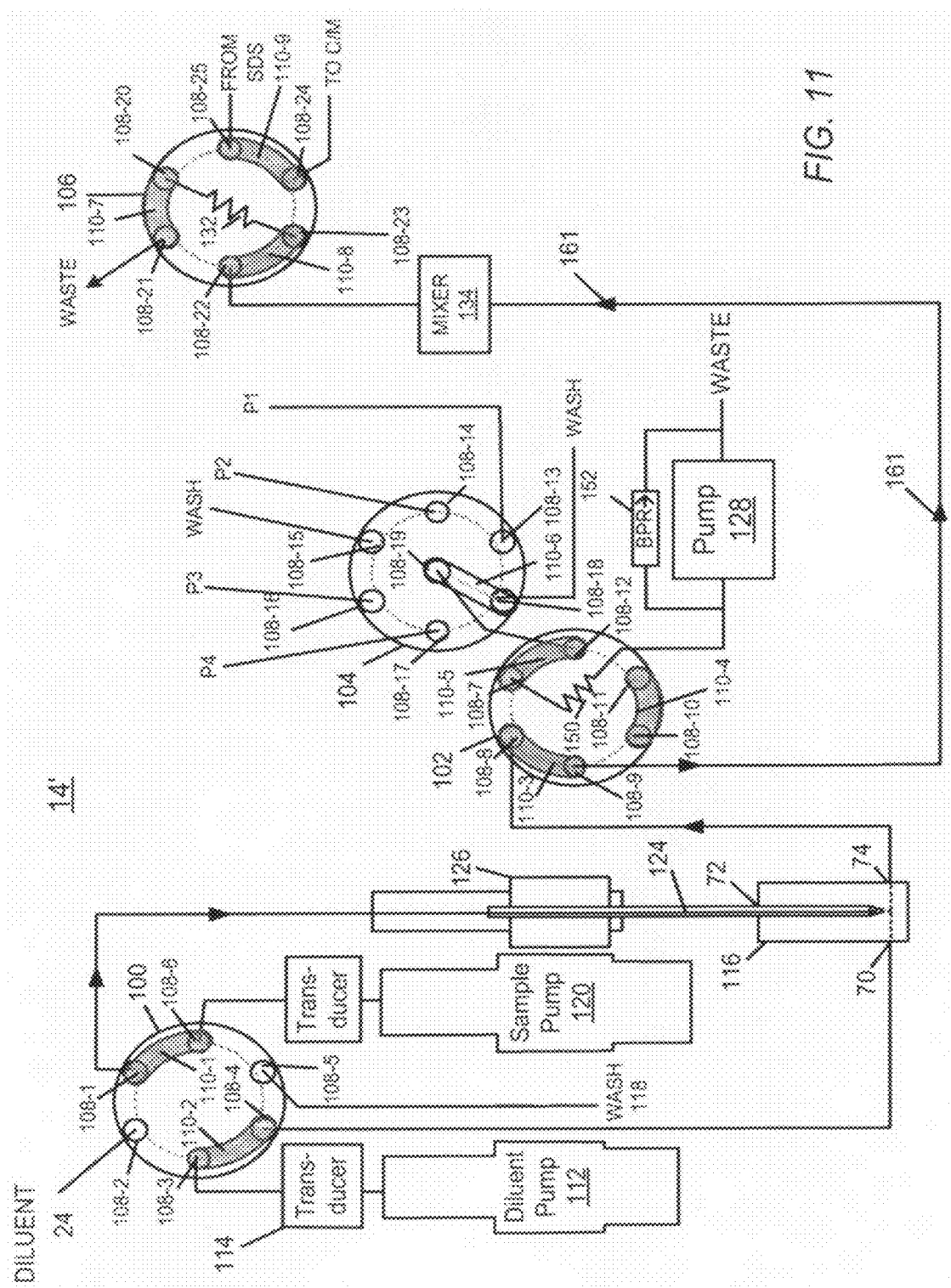
FIG. 11 is a functional diagram of the embodiment of the sample manager of FIG. 8 configured to load the diluted process sample in an injection valve.

FIG. 11 shows the sample manager 14' of FIG. 8, with the valves configured to load the dilution into the sample loop 132 within the injection valve 106. The configurations of the priming valve 100, the sampling valve 102, and process-selection valve 104 are unchanged from those of FIG. 10, whereas that of the injection valve 106 is rotated counter-clockwise by one port position such that the flow-through conduit 110-8 couples the fluidic port 108-22 to the fluidic port 108-23. This configuration of the injection valve couples one end of the sample loop 132 to the mixer 134. Continued operation of the sample pump 120 moves the dilution 161 into the sample loop 132 (while the diluent pump 112 is off).

Figure 12:
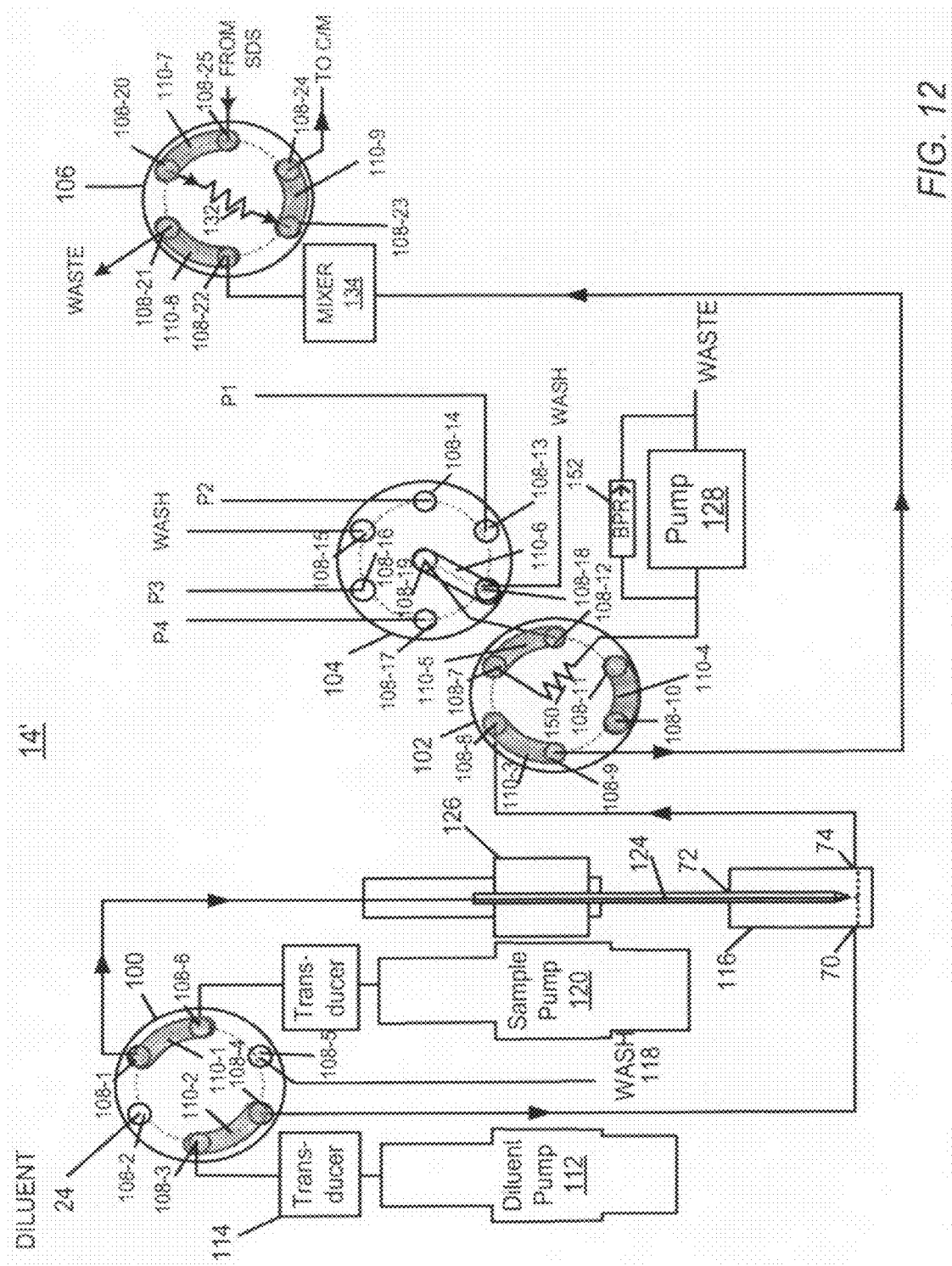
FIG. 12 is a functional diagram of the embodiment of the sample manager of FIG. 8 configured to introduce the loaded diluted process sample into a solvent composition stream.

FIG. 12 shows the sample manager 14' of FIG. 8, with the valves configured to inject the process sample within the sample loop 132 into the solvent composition stream arriving at the injection valve 106 from the solvent delivery system. The configurations of the priming valve 100, sampling valve 102, and process-selection valve 104 are unchanged from those of FIG. 11, whereas that of the injection valve 106 is changed. To introduce the diluted process sample to the solvent composition stream, the injection valve 106 is rotated clockwise by one port position from that of FIG. 11 (back to the position of FIG. 10) such that the flow-through conduit 110-7 couples the fluidic port 108-20 to the fluidic port 108-25 and the flow-through conduit 110-7 couples the fluidic port 108-23 to the fluidic port 108-24. This configuration places the entire sample loop 132, and the diluted process sample contained therein, in the path of the solvent composition stream arriving from the solvent delivery system. In this manner, the diluted process sample is introduced to the solvent composition stream. In addition, during this phase, the injection needle 124 is lowered in the injection port 72, and the diluent pump 112 and sample pump 120 are both pumping. The diluent pump washes its fluidic circuit with wash solvent and ends the phase with a fill cycle. The sample pump washes its fluidic circuit with sample and ends the phase empty.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable storage medium(s) may be utilized. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Program code embodied on a computer readable medium may be transmitted using any appropriate medium, including but not limited to wireless, wire-line, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages.

Aspects of the present invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable storage medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the invention has been shown and described with reference to specific preferred embodiments, it should be understood by those skilled in the art that various changes in form and detail may be made therein without departing from the spirit and scope of the invention as defined by the following claims.

What is claimed is:

1. An online sample manager of a liquid chromatography system, comprising:
    a fluidic tee having a first inlet port, a second inlet port, and an outlet port;
    a diluent pump in fluidic communication with a diluent source and the first inlet port of the fluidic tee;
    a process-selection valve having an intake port in fluidic communication with a process line to receive a process sample therefrom and having an outlet port;
    a process sample pump in fluidic communication with the outlet port of the process-selection valve and the second inlet port of the fluidic tee, the process sample pump configured to move an acquired process sample into the second inlet port of the fluidic tee while the diluent pump is moving the diluent into the first inlet port of the fluidic tee such that the process sample and the diluent are in the fluidic tee at a same time and merge to produce a diluted process sample that flows out from the outlet port of the fluidic tee;
    an injection valve having a first injection valve port in fluidic communication with the outlet port of the fluidic tee to receive the diluted process sample therefrom, a second injection valve port in fluidic communication with a solvent delivery system to receive a solvent composition stream therefrom, a third injection valve port and a fourth injection valve port; and
    a sample loop configured to store the diluted process sample and having one end directly coupled to the third injection valve port and an opposite end directly coupled to the fourth injection valve port.

2. The online sample manager of claim 1, wherein the process-selection valve further includes a wash intake port connected to a source of wash.

3. The online sample manager of claim 1, further comprising a needle adapted to move into and out of the second inlet port, and wherein the process sample pump includes a first pump coupled to the process-selection valve for drawing the process sample from the process line and moving the process sample into the needle, and a second pump for pushing the process sample moved into the needle by the first pump out of the needle into the fluidic tee through the second inlet port.

4. The online sample manager of claim 3, further comprising a valve system for selectively coupling the first pump and second pump to the needle, the valve system fluidically coupling the first pump to a first end of the needle so that the first pump can push the process sample into the needle, the valve system subsequently fluidically coupling the second pump to the first end of the needle, after the first pump pushes the process sample into the needle, so that the second pump can push the process sample out of the needle into the fluidic tee through the second inlet port.

5. The sample manager of claim 3, wherein the needle includes a first end and an opposite end with a tip, and further comprising a valve system for selectively coupling the first pump and second pump to the needle, the valve system fluidically coupling the first pump to the outlet port of the fluidic tee and the second pump to the first end of the needle, the first and second pumps cooperating to move the process sample into the needle through the needle's tip.

6. The sample manager of claim 5, further comprising a back pressure regulator operatively coupled to the pumping system to maintain a constant fluidic pressure between the pumps attributable to a difference in flow rates produced by the pumps.

7. The sample manager of claim 5, wherein, after the process sample moves into the needle, the second pump reverses pumping direction to push the process sample out of the needle into the fluidic tee through the second inlet port.

8. The online sample manager of claim 1, wherein a dilution ratio of a dilution is determined by flow rates of the diluent and the process sample into the fluidic tee.

9. The online sample manager of claim 1, further comprising a mixer coupled to the outlet port of the fluidic tee to provide mixing of the process sample with the diluent.

10. The online sample manager of claim 1 wherein the injection valve has a fifth injection valve port and wherein the fifth injection valve port is in fluidic communication with a chromatographic column.

11. The online sample manager of claim 10 wherein the injection valve is configurable to conduct the solvent composition stream through the sample loop and to the chromatographic column to thereby inject the diluted process sample held in the sample loop into the solvent composition stream.

12. An online sample manager of a liquid chromatography system, comprising:
- a fluidic tee having a first inlet port, a second inlet port, and an outlet port;
- a diluent pump in fluidic communication with a diluent source and the first inlet port of the fluidic tee;
- a process-selection valve in fluidic communication with a process line and having a fluidic intake port in fluidic communication with the process line to receive a process sample therefrom and having an outlet port;
- a process sample pump in fluidic communication with the outlet port of the process-selection valve and the second inlet port of the fluidic tee, the process sample pump configured to move an acquired process sample into the second inlet port of the fluidic tee while the diluent pump is moving the diluent into the first inlet port of the fluidic tee such that the process sample and the diluent are in the fluidic tee at a same time and merge to produce a diluted process sample that flows out from the outlet port of the fluidic tee;
- an injection valve having a plurality of injection valve ports, a first one of the injection valve ports being in fluidic communication with the outlet port of the fluidic tee to receive the diluted process sample therefrom;
- a sample loop configured to store the diluted process sample and having one end directly coupled to a second one of the injection valve ports and an opposite end directly coupled to a third one of the injection valve ports;
- a solvent manager comprising at least one pump in direct fluidic communication with the injection valve at a fourth one of the injection valve ports to deliver a solvent composition stream to the injection valve; and
- a chromatographic column in direct fluidic communication with the injection valve at a fifth one of the injection valve ports.

* * * * *

UNITED STATES PATENT AND TRADEMARK OFFICE
CERTIFICATE OF CORRECTION

PATENT NO. : 11,112,390 B2
APPLICATION NO. : 13/519798
DATED : September 7, 2021
INVENTOR(S) : Cormier Page 1 of 1

It is certified that error appears in the above-identified patent and that said Letters Patent is hereby corrected as shown below:

On the Title Page

Item (86) PCT No.:
After "PCT/US2011/", replace "204292" with "024292".

In the Claims

Column 14, Line 55, Claim 5:
Insert the word --online-- after "The" and before the phrase "sample manager of claim 3,".

Column 14, Line 63, Claim 6:
Insert the word --online-- after "The" and before the phrase "sample manager of claim 5,".

Column 15, Line 1, Claim 7:
Insert the word --online-- after "The" and before the phrase "sample manager of claim 5,".

Signed and Sealed this
Tenth Day of May, 2022

Katherine Kelly Vidal
*Director of the United States Patent and Trademark Office*